(12) United States Patent
Kida et al.

(10) Patent No.: US 10,735,667 B1
(45) Date of Patent: Aug. 4, 2020

(54) VEHICLE SURROUNDINGS MONITORING APPARATUS

(71) Applicants: TOYOTA JIDOSHA KABUSHIKI KAISHA, Toyota-shi, Aichi (JP); DENSO TEN Limited, Kobe-shi, Hyogo (JP)

(72) Inventors: Yusuke Kida, Tokyo (JP); Nobuhisa Ikeda, Kobe (JP)

(73) Assignees: TOYOTA JIDOSHA KABUSHIKI KAISHA, Toyota-shi (JP); DENSO TEN LIMITED, Kobe-shi (JP)

( * ) Notice: Subject to any disclaimer, the term of this patent is extended or adjusted under 35 U.S.C. 154(b) by 0 days.

(21) Appl. No.: 16/713,225

(22) Filed: Dec. 13, 2019

(30) Foreign Application Priority Data

Jan. 25, 2019 (JP) .................. 2019-011078

(51) Int. Cl.
*H04N 5/235* (2006.01)
*H04N 5/247* (2006.01)
*B60R 11/04* (2006.01)
*B60R 1/00* (2006.01)
*B60R 1/12* (2006.01)
*B60R 11/00* (2006.01)

(52) U.S. Cl.
CPC ............ *H04N 5/2354* (2013.01); *B60R 1/00* (2013.01); *B60R 11/04* (2013.01); *H04N 5/2351* (2013.01); *H04N 5/247* (2013.01); *B60R 1/12* (2013.01); *B60R 2001/1253* (2013.01); *B60R 2011/0033* (2013.01); *B60R 2300/105* (2013.01)

(58) Field of Classification Search
None
See application file for complete search history.

(56) References Cited

U.S. PATENT DOCUMENTS

| | | | |
|---|---|---|---|
| 8,098,171 B1* | 1/2012 | Szczerba | B60Q 9/008 340/438 |
| 2004/0218041 A1 | 11/2004 | Yagi | |
| 2010/0238292 A1 | 9/2010 | Sato | |
| 2016/0148062 A1* | 5/2016 | Fursich | H04N 13/239 348/36 |
| 2018/0114089 A1* | 4/2018 | Ikeda | G06K 9/2054 |
| 2018/0178724 A1 | 6/2018 | Hatakeyama et al. | |

FOREIGN PATENT DOCUMENTS

| | | |
|---|---|---|
| JP | 2004231128 A | 8/2004 |
| JP | 2010221732 A | 10/2010 |
| JP | 2012217000 A | 11/2012 |
| JP | 2016192772 A | 11/2016 |
| JP | 2018103756 A | 7/2018 |
| JP | 2018107754 A | 7/2018 |

* cited by examiner

*Primary Examiner* — Heather R Jones
(74) *Attorney, Agent, or Firm* — Dickinson Wright PLLC

(57) ABSTRACT

When each of a right IR projector and a left IR projector has been set to an IR OFF state and a final radiation ON condition becomes satisfied, a PVM-ECU sets each of the right IR projector and the left IR projector to an IR ON state. When each of the right IR projector and the left IR projector has been set to the IR ON state and a final radiation ON condition becomes satisfied, the PVM-ECU sets each of the right IR projector and the left IR projector to the IR ON state.

4 Claims, 11 Drawing Sheets

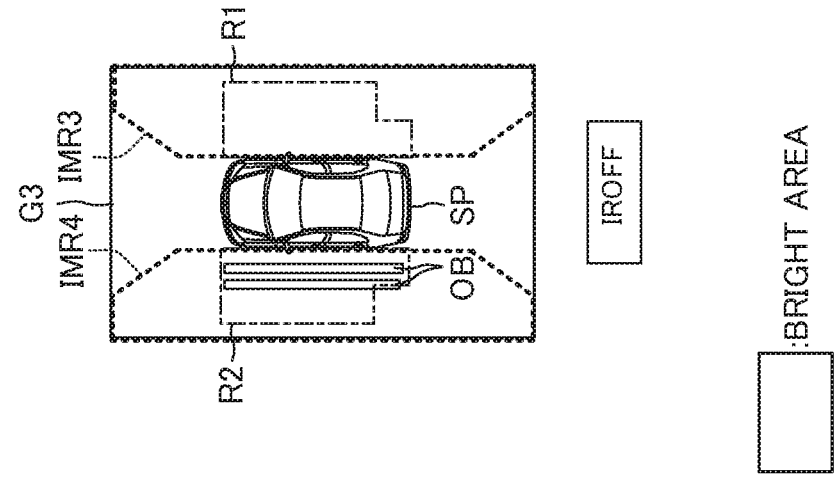
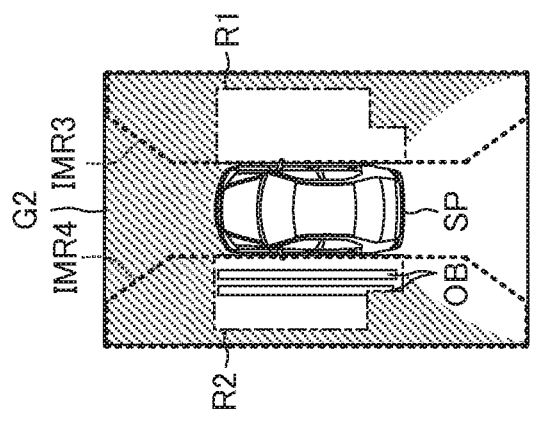
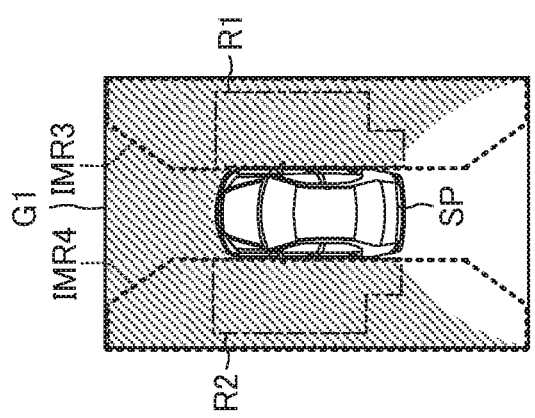

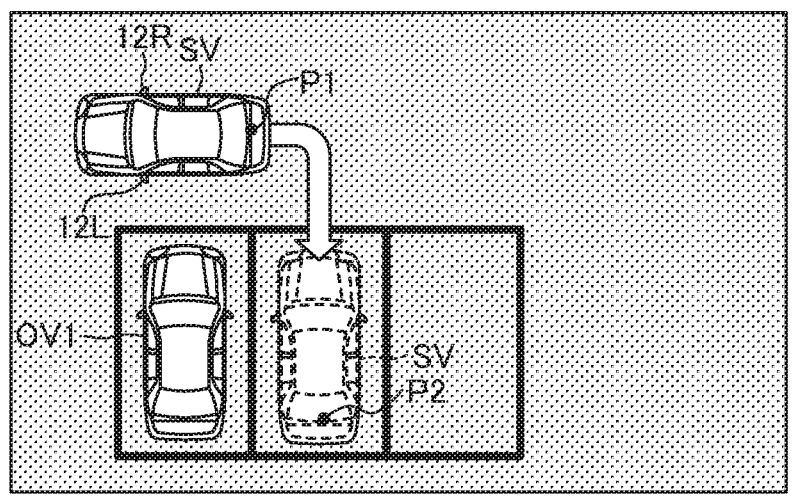
FIG.5

VEHICLE SURROUNDINGS MONITORING APPARATUS

BACKGROUND OF THE INVENTION

1. Field of the Invention

The present invention relates to a vehicle surroundings monitoring apparatus including an invisible light projector which radiates invisible light to assist an on-board camera installed in a vehicle to photograph (take a picture of) surroundings of the vehicle when the vehicle is present in a dark place.

2. Description of the Related Art

A vehicle surroundings monitoring apparatus (hereinafter, referred to as a "conventional apparatus"), which has been conventionally known, comprises a lighting device (an invisible light projector) to radiate infrared light which is invisible light to a predetermined radiation range; a control device to control the lighting device; an imaging device (a camera); and a display device to display an image generated based on image data which the imaging device has obtained/captured. For example, the conventional apparatus causes the lighting device to radiate the infrared light when the vehicle is located in a dark place and a predetermined condition becomes satisfied.

Thereby, the image generated based on the image data becomes the image which represents a curbstone, a groove, and the like distinguishably/clearly. Therefore, a driver can moves the vehicle to a position close to the curbstone, the groove, and the like, while viewing that image (refer to Japanese Patent Application Laid-Open No. 2010-221732).

Here, when the camera capable of detecting both visible light and the invisible light is installed in the vehicle, the control device can be configured to cause the invisible light projector to radiate the invisible light when an average value of illuminance in a radiation range of the invisible light (or a range to which the invisible light is to be radiated from the invisible light projector) is lower than a threshold. However, for example, when strong/bright visible light is radiated to only a part within the radiation range of the invisible light by a headlight of another vehicle, a case may occur where the average value of illuminance in the radiation range becomes higher than the threshold. As a result, the invisible light is not radiated, so that there may be a case where an object, a structure, and the like, which the camera should photograph may not be clearly photographed.

SUMMARY OF THE INVENTION

The present invention has been made in order to solve the above-described problem. That is, an object of the present invention is to provide a vehicle surroundings monitor apparatus capable of increasing a possibility of being able to appropriately radiate invisible light for assisting photographing by the on board camera. Hereinafter, the vehicle surroundings monitoring apparatus according to the present invention may also be referred to as the "present invention apparatus".

The present invention apparatus comprises:

a right side camera (11c) to photograph a right side area of a vehicle (SV) to obtain right side image data;

a left side camera (11d) to photograph a left side area of the vehicle to obtain left side image data;

a display device (21) configured to be capable of displaying an image;

a display control device (20) to cause the display device to display a peripheral image indicative of (or representing) surroundings of the vehicle based on at least any one of the right side image data and the left side image data;

a right projector (12R) configured to be capable of radiating invisible light to a right radiation range (R1) including a part overlapping with the right side area;

a left projector (12L) configured to be capable of radiating invisible light to a left radiation range (R2) including a part overlapping with the left side area; and a projector control device (10) to set each of the right projector and the left projector to any one of a radiation OFF state so as not to radiate the invisible light and a radiation ON state so as to radiate the invisible light.

That is, the radiation OFF state is a state in which the invisible light is not radiated, and the radiation ON state is a state in which the invisible light is radiated.

The projector control device is configured:

to set at least the right projector to the radiation ON state (refer to step 1060) when a right final radiation ON condition becomes satisfied (refer to a "Yes" determination at step 1050) in a case where the right projector has been set to the radiation OFF state (refer to a "Yes" determination at step 1005), the right final radiation ON condition requiring that a right luminance check area satisfies a right provisional radiation ON condition in order for the right final radiation ON condition to be satisfied, the right luminance check area corresponding to the right radiation range (R1) within a right side image represented by the right side image data, the right provisional radiation ON condition being a condition to be satisfied when a ratio (Ndark/NA) of the number (Ndark) of pixels included in the right luminance check area and having a luminance equal to or smaller than a first threshold luminance to the number (NA) of all pixels included in the right luminance check area is equal to or larger than a first threshold value (Pth1) (refer to a "Yes" determination at step 1025).

In this manner, in a case where the right projector has been in the radiation OFF state, the right projector is set/switched to the radiation ON state on the condition that the right luminance check area satisfies the right provisional radiation ON condition. Namely, the right projector is set/switched to the radiation ON state on the condition that the above-described ratio (Ndark/NA) on the right luminance check area is equal to or larger than the first threshold value (Pth1). In this case, the left projector may or may not be set/switched to the radiation ON state.

The above-described ratio (Ndark/NA) has a correlation with a ratio of an area of "a part that can be determined to be dark" to an area of the right luminance check area. Therefore, the invisible light is radiated from the right projector, not only when the entire right luminance check area is dark because the entire surroundings of the vehicle are dark, but also when a ratio of the area of "a dark part to which the invisible light is necessary to be radiated" included in the right luminance check area to the area of the right luminance check area is large although a part of the right luminance check area is bright. In other words, even when strong visible light is radiated to a small part of the right luminance check area, and thus, an average of illuminance in the right luminance check area is large, the invisible light is radiated from the right projector in a case where a part to which the invisible light needs to be radiated is wide. Accordingly, the right side camera can distinguishably/ clearly photograph an object, a structure, and the like to which the driver needs to pay attention.

Furthermore, the projector control device is configured:

to set at least the left projector to the radiation ON state (refer to step 1060) when a left final radiation ON condition becomes satisfied (refer to a "Yes" determination at step 1050) in a case where the left projector has been set to the radiation OFF state (refer to a "Yes" determination at step 1005), the left final radiation ON condition requiring that a left luminance check area satisfies a left provisional radiation ON condition in order for the left final radiation ON condition to be satisfied, the left luminance check area corresponding to the left radiation range (R2) within a left side image represented by the left side image data, the left provisional radiation ON condition being a condition to be satisfied when a ratio (Ndark/NA) of the number (Ndark) of pixels included in the left luminance check area and having a luminance equal to or smaller than the first threshold luminance to the number (NA) of all pixels included in the left luminance check area is equal to or larger than the first threshold value (Pth1) (refer to a "Yes" determination at step 1035). In this case, the right projector may or may not be set/switched to the radiation ON state.

Therefore, even when strong visible light is radiated to a small part of the left luminance check area, and thus, an average of illuminance in the left luminance check area is large, the invisible light is radiated from the left projector in a case where a part to which the invisible light needs to be radiated is wide. Accordingly, the left side camera can distinguishably/clearly photograph an object, a structure, and the like to which the driver needs to pay attention.

Furthermore, the projector control device is configured to set each of the right projector and the left projector to the radiation OFF state (step 1145), when a final radiation OFF condition becomes satisfied (refer to a "Yes" determination at step 1140) in a case where at least any one of the right projector and the left projector has been set to the radiation ON state (refer to a "Yes" determination at step 1105), the final radiation OFF condition requiring that the right luminance check area satisfies a right provisional radiation OFF condition and the left luminance check area satisfies a left provisional radiation OFF condition in order for the final radiation OFF condition to be satisfied (refer to a "Yes" determination at step 1125), the right provisional radiation OFF condition being a condition to be satisfied when a ratio (Nbrit/NA) of the number (Nbrit) of pixels included in the right luminance check area and having a luminance equal to or larger than a second threshold luminance which is larger than the first threshold luminance to the number (NA) of all pixels included in the right luminance check area is equal to or larger than a second threshold value (Pth2) which is larger than the first threshold value (Pth1), the left provisional radiation OFF condition being a condition to be satisfied when a ratio (Nbrit/NA) of the number (Nbrit) of pixels included in the left luminance check area and having a luminance equal to or larger than the second threshold luminance to the number (NA) of all pixels included in the left luminance check area is equal to or larger than the second threshold value (Pth2). In this case, the projector which has been set to the radiation OFF state before the final radiation OFF condition becomes satisfied is kept in the radiation OFF state.

In this manner, each of the right projector and the left projector is set/switched to the radiation OFF state on the condition that the above-described ratio (Nbrit/NA) on the right luminance check area is larger than the second threshold value (Pth2) and the above-described ratio (Nbrit/NA) on the left luminance check area is larger than the second threshold value (Pth2), in a case where at least any one of the right projector and the left projector has been set to the radiation ON state. That is, each of the right projector and the left projector is set/switched to the radiation OFF state when the final radiation OFF condition becomes satisfied owing to the satisfaction of the right provisional radiation OFF condition by the right luminance check area and the satisfaction of the left provisional radiation OFF condition by the left luminance check area.

Therefore, the projector which has been set to the radiation ON state is set/switched to the radiation OFF state only when each of the right luminance check area and the left luminance check area is bright overall. Therefore, even when only a part of the right luminance check area is extremely bright and/or a part of the left luminance check area is extremely bright, the projector in the radiation ON state is not changed to the radiation OFF state.

Moreover, the threshold of the luminance used to determine whether or not a certain pixel is bright is the second threshold luminance which is larger than the first threshold luminance. Therefore, even if the illuminance of the radiation range of the projector is raised due to the radiated invisible light when the state of the projector is changed from the radiation OFF state to the radiation ON state, the number (Nbrit) of the pixels having the luminance which is equal to or larger than the second threshold luminance is prevented from greatly increasing. Therefore, since the final radiation OFF condition is difficult to be satisfied immediately after the projector is changed from the radiation OFF state to the radiation ON state, it is possible to reduce a possibility that the projector is again changed to the radiation OFF state. In addition, since the second threshold value (Pth2) is larger than the first threshold value value (Pth1), the final radiation OFF condition is not satisfied unless each of the luminance check areas is determined to be bright over a wide range.

As understood from the above description, the present invention apparatus can appropriately radiate the invisible light for assisting photographing by the camera.

In one of aspects of the present invention apparatus, the projector control device is configured:

to set each of the right projector and the left projector to the radiation ON state (refer to step 1060), when the final radiation ON condition becomes satisfied (refer to a "Yes" determination at step 1050) owing to at least one of a satisfaction of the right provisional radiation ON condition by the right luminance check area and a satisfaction of the left provisional radiation ON condition by the left luminance check area (refer to a "Yes" determination at step 1025), in a case where each of the right projector and the left projector has been set to the radiation OFF state (refer to a "Yes" determination at step 1005); and to set each of the right projector and the left projector to the radiation OFF state (refer to step 1145), when the final radiation OFF condition becomes satisfied (refer to a "Yes" determination at step 1140) owing to both of a satisfaction of the right provisional radiation OFF condition by the right luminance check area and a satisfaction of the left provisional radiation OFF condition by the left luminance check area (refer to a "Yes" determination at step 1125), in a case where each of the right projector and the left projector has been set to the radiation ON state (refer to a "Yes" determination at step 1105).

According to the above-mentioned aspect, both of the right projector and the left projector can be appropriately switched from the radiation OFF state to the radiation ON state at the same time or vice versa.

In one of aspects of the present invention apparatus, the projector control device is configured:

to determine whether or not the right luminance check area satisfies the right provisional radiation ON condition every time a first predetermined time (Δt) elapses (refer to step 1025), when the right projector has been set to the radiation OFF state;

to determine that the final radiation ON condition becomes satisfied owing to a satisfaction of the right provisional radiation ON condition by the right luminance check area, when a determination that the right luminance check area satisfies the right provisional radiation ON condition is made consecutively first threshold count times which is equal to or larger than two times, when the right projector has been set to the radiation OFF state (refer to steps 1030, 1040, and 1050);

to determine whether or not the left luminance check area satisfies the left provisional radiation ON condition every time the first predetermined time (Δt) elapses (refer to step 1035), when the left projector has been set to the radiation OFF state; and to determine that the final radiation ON condition becomes satisfied owing to a satisfaction of the left provisional radiation ON condition by the left luminance check area, when a determination that the left luminance check area satisfies the left provisional radiation ON condition is made consecutively the first threshold count times, when the left projector has been set to the radiation OFF state (refer to steps 1045, 1055, and 1050).

For example, when the own vehicle is moving under a street lump, a shadow of the own vehicle or a shadow of the other object appears temporarily on the left side and/or the right side of the own vehicle, so that the right luminance check area and/or the left luminance check area may become dark for a very short time. In this case, since the above-described ratio (Ndark/NA) becomes larger than the first threshold luminance temporarily, it is determined that the right and/or left provisional radiation ON condition is satisfied. However, it is highly unlikely that such a determination consecutively is made the threshold count times. Therefore, according to the above-mentioned aspect, since the final radiation ON condition is not satisfied in such a case, it is possible to reduce a possibility that the projector is inappropriately switched from the radiation OFF state to the radiation ON state.

Meanwhile, a hazard lamp of the vehicle, a turn signal lamp of the vehicle, and the like (hereinafter, referred to as "hazard-like lamps") are repeatedly turned on and off (blinks) at a short interval. In a period when the hazard-like lamps are turned on, the above-described ratio (Nbrit/NA) may become larger than the second threshold luminance, so that each of the right luminance check area and the left luminance check area may satisfy their provisional radiation OFF conditions temporally. In this case, if the final radiation OFF condition is satisfied, the projector may be set to the radiation OFF state even when the invisible light needs to be radiated in a period when the hazard-like lamps are turned off.

In view of the above, in one of aspects of the present invention apparatus, the projector control device is configured:

to determine whether or not the right luminance check area satisfies the right provisional radiation OFF condition and determine whether or not the left luminance check area satisfies the left provisional radiation OFF condition (refer to step 1125), every time a second predetermined time (Δt) elapses, when at least any one of the right projector and the left projector has been set to the radiation ON state (refer to a "Yes" determination at step 1105); and to determine that the final radiation OFF condition becomes satisfied, when a determination that the right luminance check area satisfies the right provisional radiation OFF condition and the left luminance check area satisfies the left provisional radiation OFF condition is made consecutively second threshold count times which is equal to or larger than two times, when at least any one of the right projector and the left projector has been set to the radiation ON state (refer to steps 1130, 1135, and 1140).

For example, even if it is determined that each of the right luminance check area and the left luminance check area satisfies their provisional radiation OFF conditions temporally in the period when the hazard-like lamps are turned on, it is unlikely that such a determination will not be made consecutively the second threshold count times since the hazard-like lamps are turned off within a short time. Therefore, according to the above-mentioned aspect, it is possible to reduce a possibility that the final radiation OFF condition becomes satisfied due to blinking of the hazard-like lamps, in the case where the radiation of the invisible light is necessary. Consequently, it is possible to reduce a possibility that the projector is inappropriately switched from the radiation ON state to the radiation OFF state.

In the above description, the terms and/or the reference symbols used in the following description regarding embodiment are added with parentheses to the elements of the present invention apparatus, in order to assist in understanding the present invention. However, those reference symbols should not be used to limit the scope of the invention.

BRIEF DESCRIPTION OF DRAWINGS

FIG. 3A illustrates an overhead view image displayed on a display part when the IR projector is in an IR OFF state.

FIG. 3B illustrates an overhead view image displayed on the display part when the IR projector is in an IR ON state.

FIG. 3C illustrates an overhead view image displayed on the display part when the IR projector is in the IR OFF state.

FIG. 5 is a plan view illustrating control of an invisible light projector which is performed in a situation 1.

DETAILED DESCRIPTION OF THE EMBODIMENT

<Construction>

Figure 1:
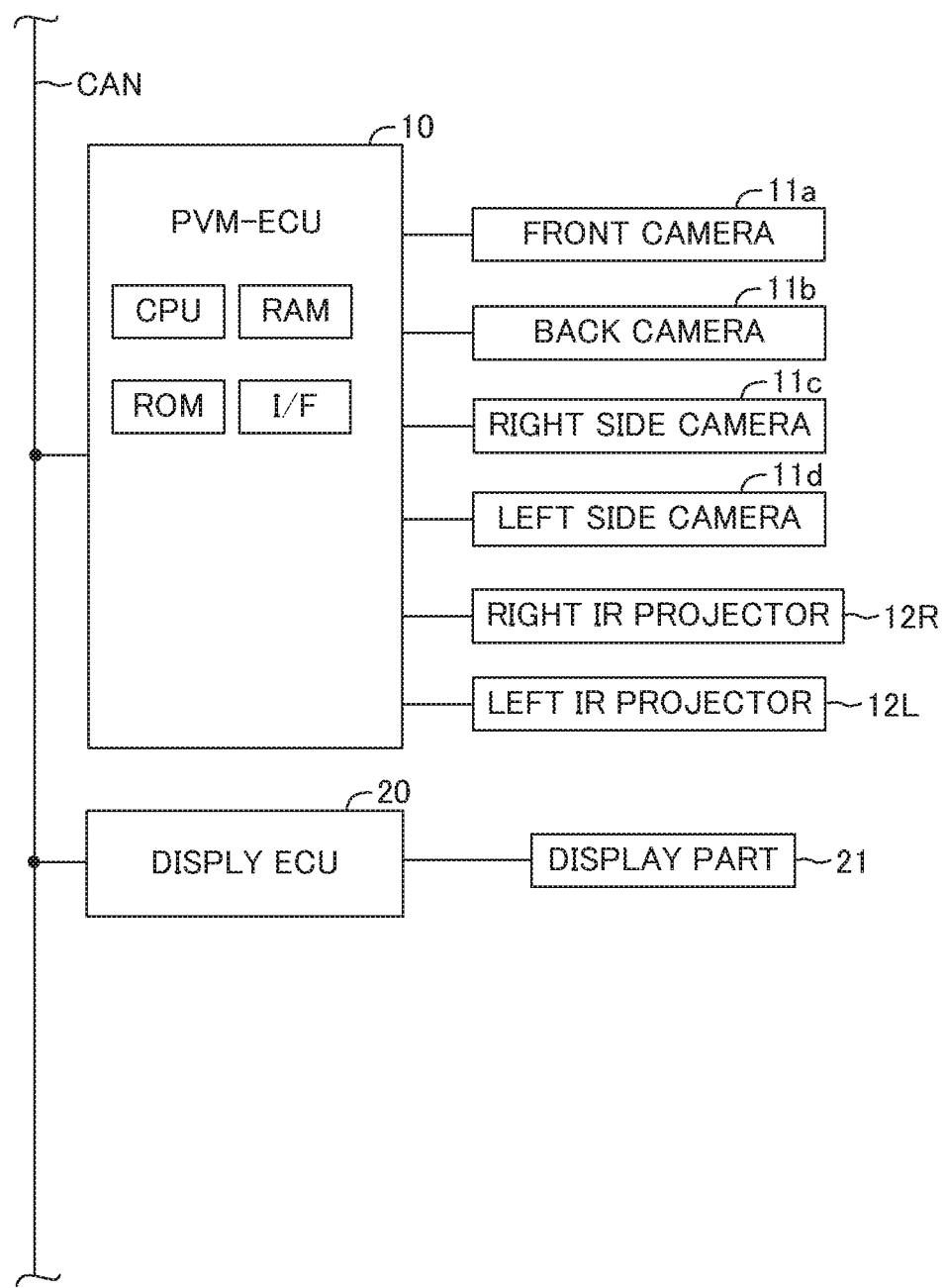
FIG. 1 is a schematic configuration diagram illustrating a vehicle surroundings monitoring apparatus according to an embodiment of the present invention.

A vehicle surroundings monitoring apparatus (hereinafter, referred to as a "present apparatus") according to an embodiment of the present disclosure is applied to a vehicle SV (refer to FIG. 2). The vehicle SV is sometimes referred to as an "own vehicle SV" to distinguish the vehicle SV from other vehicles. The present apparatus includes a PVM (Panoramic View Monitor) ECU 10 and a display ECU 20 which functions as a display control device. Hereinafter, the PVM ECU 10 is simply referred to as an "ECU 10". The ECU 10 is also a projector control device.

Those ECUs are connected with each other via a CAN (Controller Area Network) so that they are capable of mutually exchanging (communicating) data (information). Each of the ECUs includes a microcomputer. The microcomputer includes a CPU, a ROM, a RAM, and an interface I/F. The CPU realizes various functions by executing instructions (programs, routines) stored in the ROM.

A front camera 11a, a back camera 11b, a right side camera 11c, a left side camera 11d, a right IR projector, and a left IR projector 12L are connected to the ECU 10. It should be noted that when the front camera 11a, the back camera 11b, the right side camera 11c, and the left side camera 11d do not need to be distinguished from each other, each of them is referred to as a "camera 11". Hereinafter, the camera 11 is also referred to as an "imaging device".

Figure 2:
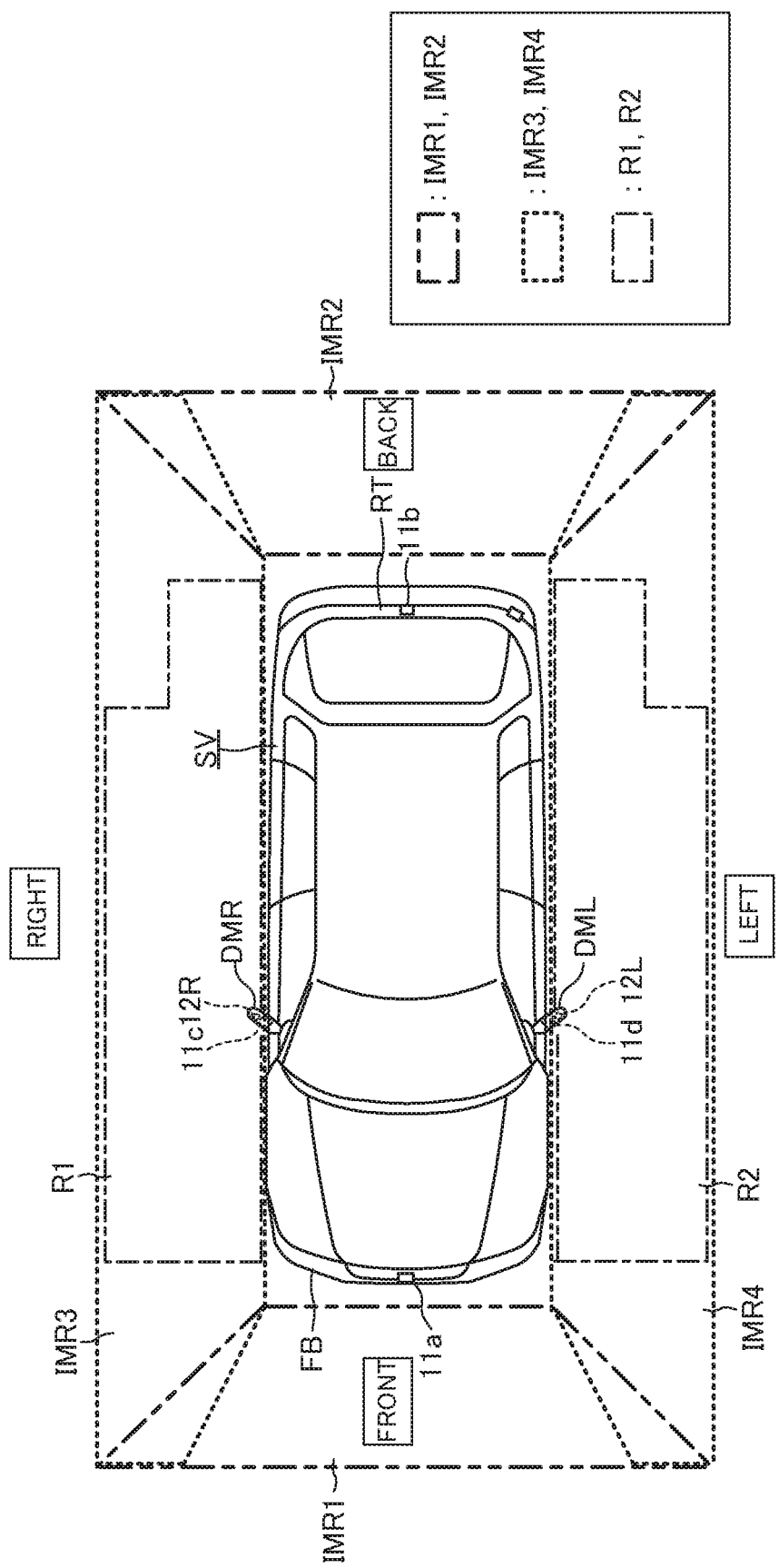
FIG. 2 is a plan view illustrating an imaging range of a camera and a radiation range of an IR projector.

As shown in FIG. 2, the front camera 11a is provided at a substantially central portion of a front bumper FB in a vehicle width direction. An optical axis of the front camera 11a faces/extends forward from the own vehicle SV. The back camera 11b is provided at a wall portion of a rear trunk RT at a rear portion of the own vehicle SV. An optical axis of the back camera 11b faces/extends backward from the own vehicle SV. The right side camera 11c is provided at a right side door mirror DMR. An optical axis of the right side camera 11c faces/extends rightward from the own vehicle SV. The left side camera 11d is provided at a left side door mirror DML. An optical axis of the left side camera 11d faces/extends leftward from the own vehicle SV.

An angle of view of the camera 11 is a wide angle. Therefore, an imaging range of the camera 11 includes "a range on a diagonal right side with respect to the optical axis, a range on a diagonal left side with respect to the optical axis, a range on a diagonal lower side with respect to the optical axis, and a range on a diagonal upper side with respect to the optical axis". The imaging ranges of the four cameras 11 cover entire surroundings of the own vehicle SV.

The camera 11 is configured to be capable of detecting both visible light and invisible light. In this embodiment, the invisible light is near infrared light which is a kind of the IR light and is simply referred to as "IR light", hereinafter. Therefore, the camera 11 can clearly photograph/capture the surroundings of the own vehicle SV not only in an environment where the visible light is strong, but also in an environment where the visible light is weak and the IR light is strong.

The camera 11 photographs (takes an image of) a "part of the surroundings (a peripheral area) of the own vehicle SV" which corresponds to its imaging range to thereby obtain image information (image data) on the imaging range, every time a predetermined time Δt (for example, 100 ms) elapses. The camera 11 transmits the obtained image data to the ECU 10.

More specifically, the front camera 11a photographs "the part area of the peripheral area in front (ahead) of the own vehicle SV" corresponding to an imaging range IMR1 which is a range surrounded by a two-dot chain line in FIG. 2. The front camera 11a obtains the image data (hereinafter, referred to as "front image data") obtained by photographing that part area to transmit the obtained image data to the ECU 10. The back camera 11b photographs "the part area of the peripheral area behind the own vehicle SV" corresponding to an imaging range IMR2 which is a range surrounded by the two-dot chain line in FIG. 2. The back camera 11b obtains the image data (hereinafter, referred to as "backward image data") obtained by photographing that part area to transmit the obtained image data to the ECU 10. The right side camera 11c photographs "the part area of the peripheral area on the right side of the own vehicle SV" corresponding to an imaging range IMR3 which is a range surrounded by the two-dot chain line in FIG. 2. The right side camera 11c obtains the image data (hereinafter, referred to as "right side image data") obtained by photographing that part area to transmit the obtained image data to the ECU 10. The left side camera 11d photographs "the part area of the peripheral area on the left side of the own vehicle SV" corresponding to an imaging range IMR4 which is a range surrounded by the two-dot chain line in FIG. 2. The left side camera 11d obtains the image data (hereinafter, referred to as "left side image data") obtained by photographing that part area to transmit the obtained image data to the ECU 10.

The ECU 10 generates peripheral/surroundings image data using the front image data, the backward image data, the right side image data, and the left side image data. The image displayed (generated) based on the peripheral image data is referred to as a "peripheral image". The peripheral image is an image corresponding to a range of at least a part of the peripheral area of the own vehicle SV. The peripheral image includes a camera viewpoint image and composite images. The camera viewpoint image is an image whose viewpoint is an arrangement position of a lens of the camera 11. In other words, the camera viewpoint image is an image when viewing the surroundings of the own vehicle SV from the arrangement position of the lens of the camera 11. One of the composite images is an image (hereinafter, also referred to as a "virtual viewpoint image") when viewing the surroundings of the own vehicle SV from a virtual viewpoint set at an arbitrary position around the own vehicle SV.

A method for generating the virtual viewpoint image is well known (for example, refer to Japanese Patent Application Laid-Open No. 2012-217000, Japanese Patent Application Laid-Open No. 2016-192772, and Japanese Patent Application Laid-Open No. 2018-107754). It should be noted that the ECU 10 may generate an image obtained by combining other images, lines, or the like, together with each of the camera viewpoint image and the virtual viewpoint image. For example, one of the other images is a vehicle image (for example, a polygon indicative of a shape of the own vehicle SV). The lines are ones that can support a driver's parking operation (a movement of the vehicle for parking). That image generated in the above-described manner is also referred to as the "peripheral image".

An outline of the method for generating virtual viewpoint image data will be briefly described. The virtual viewpoint image is generated based on the virtual viewpoint image data. The ECU 10 projects pixels included in the front image data, the backward image data, the right side image data, and the left side image data, onto a predetermined projection curved surface (for example, a curved surface having a bowl shape or a half-sphere) in a virtual three-dimensional space.

The center of the predetermined projection curved surface corresponds to the predetermined (or center) position in a plan view of the own vehicle SV. The projection curved surface corresponds to (or is allocated to) the front image data, the backward image data, the right side image data, and the left side image data. The ECU 10 projects information on the pixels included in the front image data, the backward image data, the right side image data, and the left side image data, onto the predetermined projection curved surface.

The ECU 10 arranges the polygon representing the shape of the own vehicle SV at the center of the predetermined projection curved surface. Thereafter, the ECU 10 sets the virtual viewpoint in the virtual three-dimensional space to cut out/extract as image data a predetermined area of the predetermined projection curved surface when viewing from the set virtual viewpoint, the predetermined area being in a predetermined view angle. Furthermore, the ECU 10 superimposes "the polygon representing the shape of the vehicle SV" included in the predetermined view angle when viewing from the virtual viewpoint onto the image data which has been cut out/extracted. Thereby, the virtual viewpoint image data is generated.

A right IR projector 12R is provided/disposed in the vicinity of the right side camera 11c. The right IR projector 12R is also referred to as "a right projector or a right radiation device" for convenience. The right IR projector 12R is configured to be capable of radiating the IR light to a radiation range R1 (hereinafter, referred to as a "right radiation range R1") which is a range surrounded by a one-dot chain line in FIG. 2.

The right radiation range R1 is included in the imaging range IMR3 of the right side camera 11c and overlaps with a part of the imaging range IMR3. The right radiation range R1 is a range which the light of the headlight and the taillight of the own vehicle SV are difficult to reach and is set to "a predetermined range on the right side of the own vehicle SV". The predetermined range on the right side of the own vehicle SV is a range to which the driver needs to pay attention when the driver performs a driving operation for parking the own vehicle SV. The right IR projector 12R radiates the IR light to the right radiation range R1 in order for the right side camera 11c to clearly capture/photograph a dark area (an area which the visible light does not reach) within the imaging range IMR3.

A left IR projector 12L is provided/disposed in the vicinity of the left side camera 11d. The left IR projector 12L is also referred to as "a left projector or a left radiation device" for convenience. The left IR projector 12L is configured to be capable of radiating the IR light to a radiation range R2 (hereinafter, referred to as a "left radiation range R2") which is a range surrounded by the one-dot chain line in FIG. 2.

The left radiation range R2 is included in the imaging range IMR4 of the left side camera 11d and overlaps with a part of the imaging range IMR4. The left radiation range R2 is a range which the light of the headlight and the taillight of the own vehicle SV are difficult to reach and is set to "a predetermined range on the left side of the own vehicle SV". The predetermined range on the left side of the own vehicle SV is a range to which the driver needs to pay attention when the driver performs the driving operation for parking the own vehicle SV. The left IR projector 12L radiates the IR light to the left radiation range R2 in order for the left side camera 11d to clearly photograph/capture a dark area (an area which the visible light does not reach) within the imaging range IMR4.

It should be noted that, hereinafter, when the right IR projector 12R and the left IR projector 12L do not need to be distinguished from each other, each of them is referred to as an "IR projector 12". Hereinafter, when the right radiation range R1 and the left radiation range R2 do not need to be distinguished from each other, each of them is referred to as a "radiation range R".

The IR projector 12 is set to any one of an IR ON state and an IR OFF state in response to an instruction transmitted from the ECU 10. The IR ON state is a state in which an IR light emitting unit (not shown) included in the IR projector 12 is turned on and thereby, the IR projector 12 radiates the IR light to the radiation range R. The IR ON state is also referred to as a "radiation ON state" for convenience. The IR OFF state is a state in which the IR light emitting unit is turned off and thereby, the IR projector 12 does not radiate the IR light to the radiation range R. The IR OFF state is also referred to as a "radiation OFF state" for convenience.

It should be noted that the display ECU 20 displays "the peripheral image which is generated by the ECU 10 based on the peripheral image data" on the display part (the display device) 21 in response to an instruction transmitted from the ECU 10. The display part 21 is a touchscreen type display. The display part 21 may be another type of display (for example, a head-up display) as long as the image generated based on the image data can be displayed.

<Operation>

The ECU 10 displays an overhead view image as one of the peripheral images on the display part 21 using the display ECU 20. The overhead view image is a virtual viewpoint image which is an image from a virtual viewpoint. The virtual viewpoint is set immediately above the own vehicle SV in the virtual three-dimensional space and is away from the own vehicle SV by a predetermined distance. That overhead view image includes a polygon SP corresponding to the own vehicle SV.

Hereinafter, unless otherwise noted, a dark place means a place where the visible light is difficult to reach and has the low illuminance. Hereinafter, unless otherwise noted, a bright place means a place where the visible light has reached and has the high illuminance. Here, it is assumed that the own vehicle SV is present/located in "a place (the dark place) where the entire surroundings of the own vehicle SV are dark" and only the tail lights are turned on.

If each of the right IR projector 12R and the left IR projector 12L has been set at the IR OFF state, the IR light is radiated to neither the right radiation range R1 nor the left radiation range R2. Therefore, as shown in FIG. 3A, under the above assumption, even if an obstacle OB is present within the imaging range IMR4, that obstacle OB is not reflected in the "left side image data corresponding to the imaging range IMR4". Accordingly, since that obstacle OB is not reflected/shown in an overhead view image G1, it is difficult for the driver to recognize the obstacle OB based on the overhead view image G1.

In contrast, if each of the right IR projector 12R and the left IR projector 12L is set to/at the IR ON state, the IR light is radiated to both of the right radiation range R1 and the left radiation range R2. Therefore, as shown in FIG. 3B, since the obstacle OB present within the imaging range IMR4 is reflected in the "left side image data corresponding to the imaging range IMR4", the obstacle OB is reflected/shown in an overhead view image G2. Accordingly, the driver can recognize the obstacle OB based on the overhead view image G2.

Meanwhile, when the own vehicle SV is present/located in a "place (the bright place) where the entire surroundings of the own vehicle SV are bright", the "right side image data corresponding to the imaging range IMR3" becomes the image data which represents the right side area clearly even if the right IR projector 12 is in the IR OFF state. Similarly, when the own vehicle SV is present/located in the "place where the entire surroundings of the own vehicle SV are bright", the "left side image data corresponding to the imaging range IMR4" becomes the image data which represents the left side area clearly even if the left IR projector is in the IR OFF state.

Therefore, as shown in FIG. 3C, since the obstacle OB which is present within the imaging range IMR4 is reflected in the "left side image data corresponding to the imaging range IMR4", the obstacle OB is reflected/shown in an overhead view image G3. Thus, when the own vehicle SV is present/located in the "place where the entire surroundings of the own vehicle SV are bright", the diver is easy to recognize the obstacle OB based on the overhead view image G3.

As understood from the above description, when the radiation range R is bright, the IR projector 12 does not have to be set to the IR ON state, and thus, it is preferable that the IR projector be set to the IR OFF state.

Incidentally, when illuminance distribution in the radiation range R is uniform, brightness of the radiation range R corresponds to an average luminance value of an "image corresponding to the radiation range R". Therefore, when the illumination distribution in the radiation range R is uniform, the IR projector 12 can be set to any one of the IR ON state and the IR OFF state depending on the average luminance value of the "image corresponding to the radiation range R". Hereinafter, the average luminance value of the "image corresponding to the radiation range R" is simply referred to as an "average luminance value of the radiation range R" in some cases.

That is, for example, when the average luminance value of the radiation range R is equal to or smaller than a predetermined threshold, the IR projector 12 may be set to the IR ON state. In contrast, when the average luminance value of the radiation range R is larger than the predetermined threshold, the IR projector 12 may be set to the IR OFF state.

However, since various ambient light is radiated to/applied to the radiation range R, the illumination distribution in the radiation range R is often not uniform. The various ambient light is, for example, a light which a headlight of the other vehicle emits and a light which a street lamp emits. Therefore, as mentioned above, when the IR projector 12 is set to any one of the IR ON state and the IR OFF state based on a comparison result between the average luminance value of the radiation range R and the predetermined threshold, problems 1 to 3 described below may occur.

<Problem 1>

The problem 1 is caused by influence of the ambient light which is radiated to only a part of the radiation range R. When strong/bright light (strong ambient light) is being radiated to only a part of the radiation range R, there is a possibility that the average luminance value of the radiation range R exceeds the predetermined threshold under the influence of that strong light. In this case, even if there is a part to which the IR light needs to be radiated within the radiation range R, the IR projector 12 is unfavorably set to the IR OFF state. This is the problem 1 to be solved.

<Problem 2>

The problem 2 is caused by influence of the IR light which the IR projector emits/radiates. When the average luminance value of the radiation range R becomes smaller than the predetermined threshold, and thus, the IR projector is set to the IR ON state, a case may occur where the average luminance value of the radiation range exceeds the predetermined threshold under the influence of the IR light which is radiated to the radiation range R. In this case, the state of the IR projector 12 is immediately returned/set to the IR OFF state. As a result, there arises the problem 2 that the state of the IR projector 12 repeatedly switches/changes between the IR OFF state and the IR ON state within a short time.

<Problem 3>

The problem 3 is caused by influence of change in brightness of the radiation range R in/for a short time. For example, when a hazard lamp of the own vehicle SV is blinking, a state of the radiation range R switches/changes between a bright state and a dark state, every time a very short time elapses. In such a case, the state of the average luminance value of the radiation range R repeatedly switches/changes between a state in which the average luminance value of the radiation range is larger than the threshold and a state in which the average luminance value of the radiation range is smaller than the predetermined threshold in/for a short time. Therefore, there arises the problem 3 that the state of the IR projector 12 repeatedly switches/changes between the IR OFF state and the IR ON state every time a short time elapses.

In order to solve the above-described problems 1 to 3, the ECU 10 executes a series of processing described below every time a predetermined time Δt (for example, 100 ms) elapses to thereby set the IR projector 12 to any one of the IR OFF state and the IR ON state.

The ECU 10 cuts out/extracts a predetermined range (in this embodiment, the right radiation range (image) R1) from the right side image represented/expressed by the right side image data as a right luminance check area (image). Similarly, the ECU 10 cuts out/extracts a predetermined range (in this embodiment, the left radiation range (image) R2) from the left side image represented/expressed by the left side image as a left luminance check area (image).

The ECU 10 calculates each of the luminance values of all pixels included in the right luminance check area and each of the luminance values of all pixels included in the left luminance check area. For example, each of the luminance values is represented by any number from 1 to 256. Each of the luminance values increases as the luminance increases.

Figure 4:
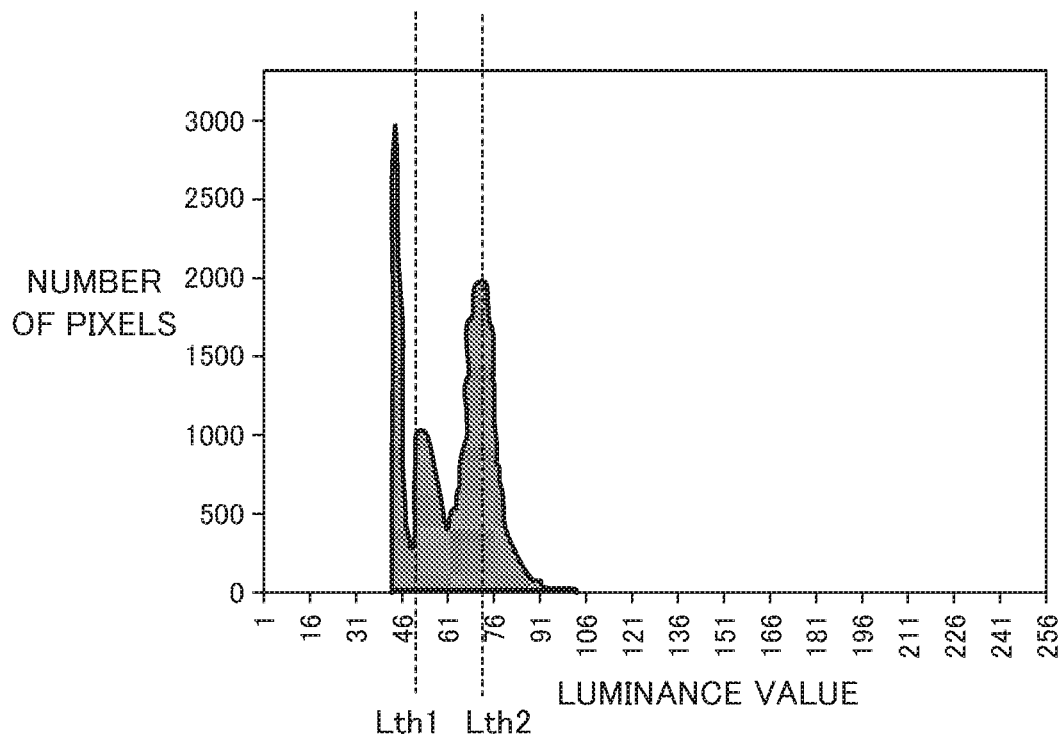
FIG. 4 illustrates a histogram indicative of luminance distribution in a luminance check area.

As shown in FIG. 4, the ECU 10 produces/makes a luminance histogram with a horizontal axis as the luminance value and a vertical axis as the number of pixels, every time the predetermined time Δt elapses. Hereinafter, the luminance histogram is simply referred to as a "histogram". The histogram is produced for each of the right luminance check area and the left luminance check area. The histogram for the right luminance check area is indicative of distribution of the luminance value in the right luminance check area. The histogram for the left luminance check area is indicative of distribution of the luminance value in the left luminance check area. It should be noted that when the right luminance check area and the left luminance check area do not need to be distinguished from each other, each of them is referred to as a "luminance check area".

(Final Radiation ON Condition)

When each of the right IR projector 12R and the left IR projector 12L has been set to the IR OFF state, the ECU 10 determines whether or not a "final radiation ON condition" described below is satisfied based on the histograms.

The final radiation ON condition: the final radiation ON condition is a condition to be satisfied when at least any one of the right luminance check area and the left luminance check area satisfies a provisional radiation ON condition described below at all determination opportunities that are consecutive in time, the number of the determination opportunities being a first threshold count Qth1.

That is, for example, the ECU 10 determines whether or not the right luminance check area satisfies the provisional radiation ON condition every time the predetermined time Δt elapses. In this case, if a determination that the right luminance check area satisfies the provisional radiation ON condition is consecutively made the first threshold count Qth1 times, the final radiation ON condition is satisfied. Similarly, the ECU 10 determines whether or not the left luminance check area satisfies the provisional radiation ON condition every time the predetermined time Δt elapses. In this case, if determination that the left luminance check area satisfies the provisional radiation ON condition is consecutively made the first threshold count Qth1 times, the final radiation ON condition is satisfied.

The provisional radiation ON condition: the provisional radiation ON condition is a condition to be satisfied when a ratio (=Ndark/NA) of the number Ndark to the total number NA is equal to or larger than a first threshold Pth1.

The number Ndark is the number of pixels (i.e., relatively dark pixels) having luminance value equal to or smaller than a threshold luminance Lth1 and included in any one of "the right luminance check area and the left luminance check area" that serves/functions as a determination target area. The total number of all pixels is the total number of pixels included in any one of "the right luminance check area and the left luminance check area" as the determination target area.

Namely, the total number NA is the total number of all of the pixels included in "the right luminance check area" if the number Ndark is the number of the relatively dark pixels included in "the right luminance check area".

The total number NA is the total number of all of the pixels included in "the left luminance check area" if the number Ndark is the number of the relatively dark pixels included in "the left luminance check area".

In other words, that ratio (=Ndark/NA) corresponds to (or is proportional to) a ratio of an "area of the part which can be determined to be dark within the right luminance check area" to an "area of the right luminance check area", or a ratio of an "area of the part which can be determined to be dark in the left luminance check area" to an "area of the left luminance check area".

The first threshold luminance Lth1 is set to a luminance value corresponding/equal to a illuminance selected from an illuminance range appropriate for determining that a certain pixel is dark. In the present example, the illuminance range is equal to or smaller than 2 [lx], and the a luminance value is set to 2 [lx], for example.

The first threshold Pth1 is set in consideration of a case where the smallest obstacle of the obstacles to which the driver needs to pay attention is present within the radiation range R. In this embodiment, the first threshold Pth1 is 20%, for example.

The first threshold count Qth1 is set to an appropriate value to avoid immediate satisfaction of the final ON radiation condition when a dark part is generated within the radiation range R for a very short time due to change in the ambient light. For example, since the hazard lamp switches from a lighting state to a light-out/off state or vice versa every time a time Th (for example, 300 ms to 400 ms) elapses, the first threshold count Qth1 is determined in such a manner that a time (=Qth1·Δt) which is a product of the first threshold count Qth1 and the predetermined time Δt is longer than the time Th. For example, the first threshold count Qth1 is a value selected from two or more. In this embodiment, the first threshold count Qth1 is three.

When the final radiation ON condition becomes satisfied, the ECU 10 sets each of the right IR projector 12R and the left IR projector 12L to the IR ON state. As a result, the right IR projector 12R radiates the IR light to the right radiation range R1 and the left IR projector 12L radiates the IR light to the left radiation range R2.

(Final Radiation OFF Condition)

When both of the right IR projector 12R and the left IR projector 12L have been set to the IR ON states, the ECU 10 determines whether or not a "final radiation OFF condition" described below is satisfied based on the above-described histograms.

The final radiation OFF condition: the final radiation OFF condition is a condition to be satisfied when both of the right luminance check area and the left luminance check area satisfy a provisional radiation OFF condition described below at all determination opportunities that are consecutive in time, the number of the determination opportunities being the second threshold count Qth2.

That is, for example, the ECU 10 determines whether or not each of the right luminance check area and the left luminance check area satisfies the provisional radiation OFF condition every time the predetermined time Δt elapses. In this case, when a determination that the right luminance check area satisfies the provisional radiation OFF condition and the left luminance check area satisfies the provisional radiation OFF condition is consecutively made the threshold count Qth2 times, the final radiation OFF condition is satisfied.

The provisional radiation OFF condition: the provisional radiation OFF condition is a condition to be satisfied when a ratio (=Nbrit/NA) of the number Nbrit to the total number NA is equal to or larger than a second threshold Pth2.

The number Nbrit is the number of pixels (i.e., relatively bright pixels) having a luminance value equal to or larger than a second threshold luminance Lth2 and included in the determination target area which is either the right luminance check area or the left luminance check area. In this case as well, the total number NA of all pixels included in the determination target area is the total number of all pixels included in any one of "the right luminance check area and the left luminance check area" as the determination target area. Namely, the total number NA is the total number of all of the pixels included in "the right luminance check area" if the number Nbrit is the number of the relatively bright pixels included in "the right luminance check area". The total number NA is the total number of all of the pixels included in "the left luminance check area" if the number Nbrit is the number of the relatively bright pixels included in "the left luminance check area".

In other words, that ratio (=Nbrit/NA) corresponds to (or is proportional to) a ratio of an "area of the part which can be determined to be bright within the right luminance check area" to the "area of the right luminance check area", or a ratio of an "area of the part which can be determined to be bright in the left luminance check area" to the "area of the left luminance check area".

The second threshold luminance Lth2 is an appropriate value for determining that a certain pixel is bright and is set to a value larger than the first threshold luminance Lth1. Furthermore, the second threshold luminance Lth2 is set to a luminance value corresponding/equal to an illuminance (for example, 3.0 [lx] in this embodiment) larger than an illuminance change (for example, 2.5 [lx]) by which the illuminance is increased/raised due to the IR light when the state of the IR projector 12 is changed from the IR OFF state to the IR ON state.

The second threshold Pth2 is set to a value (for example, 90%) appropriate for determining that the luminance check area is bright overall.

The second threshold count Qth2 is set to an appropriate value for the final OFF radiation condition not to be immediately satisfied in a case where a bright part is generated within the radiation range R for a very short time due to change in the ambient light. As mentioned above, since the hazard lamp switches from the lighting state to the light-out state or vice versa, every time a time Th (for example, 300 ms to 400 ms) elapses, the second threshold count Qth2 is determined in such a manner that a time (=Qth2·Δt) which is a product of the second threshold count Qth2 and the predetermined time Δt is longer than the time Th. For example, the second threshold count Qth2 is a value selected from two or more. In this embodiment, the second threshold count Qth2 is three.

When the final radiation OFF condition becomes satisfied, the ECU 10 sets each of the right IR projector 12 R and the left IR projector 12L to the IR OFF state. As a result, the IR light is radiated to neither the right radiation range R1 nor the left radiation range R2.

Specific Example

According to the ECU 10 which operates in the above manner, for example, even if a situation of the own vehicle SV is any one of the following situations 1 to 5-2, the IR projector 12 can be appropriately set to any one of the IR ON state and the IR OFF state. It should be noted that, in those situations, if there is no ambient light such as the light of the headlight of the other vehicle and the light of the hazard lamp of the own vehicle SV, it is assumed that the entire surroundings of the own vehicle SV are dark.

(Situation 1)

A situation 1 shown in FIG. 5 is a situation in which both of the right radiation range R1 and the left radiation range R2 remain (continue being) dark overall, while the own vehicle SV moves from a parking movement start position P1 to a parking movement complete position P2 which is located on the right side of an other vehicle OV1. It should be noted that, in FIG. 5, a solid line shows the own vehicle SV which has stopped at the parking movement start position P1, an arrow shows a path on/along which the own vehicle SV moves, and a dashed line shows the own vehicle SV which has stopped at the parking movement complete position P2 (the same applies to FIGS. 6 and 7 described below).

In the situation 1, when the own vehicle SV is located/positioned at the parking movement start position P1, the final radiation ON condition is satisfied. Therefore, each of the right IR projector 12R and the left IR projector 12L is set to the IR ON state. Thereafter, while the own vehicle SV is moving from the parking movement start position P1 to the parking movement complete position P2, the final radiation OFF state is not satisfied. Therefore, while the own vehicle SV is moving, each of the right IR projector 12R and the left IR projector 12L remains in the IR ON state.

(Situation 2-1)

Figure 6:
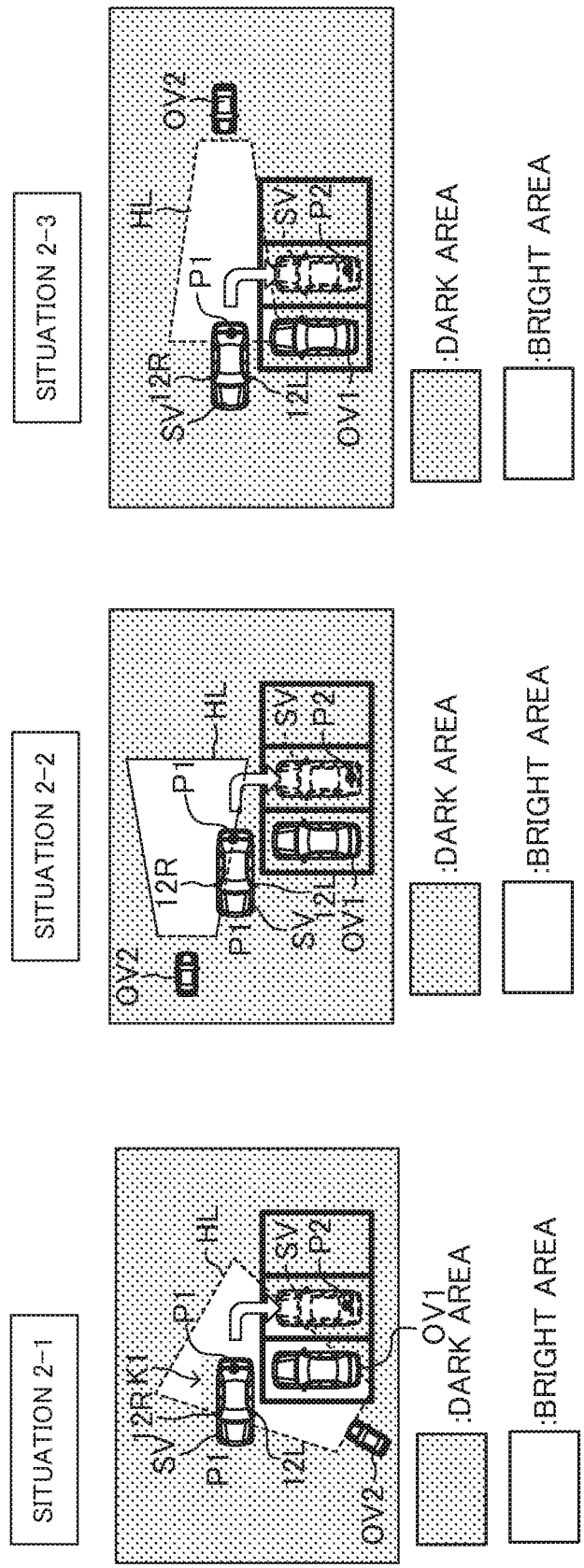
FIG. 6 is a plan view illustrating control of the invisible light projector which is performed in situations 2-1 to 2-3.

A situation 2-1 shown in FIG. 6 is a situation in which the light HL of the headlight of an other vehicle OV2 located on the left side of the own vehicle SV is being radiated while the own vehicle SV is moving from the parking movement start position P1 to the parking movement complete position P2.

In the situation 2-1, when the own vehicle SV has stopped at the parking movement start position P1, a shadow of the own vehicle SV is generated/formed in an area K1 due to the light HL of the headlight of the other vehicle OV2. For this reason, the right luminance check area satisfies the provisional radiation ON condition the first threshold count Qth1 times or more. Therefore, since the final radiation ON condition is satisfied when the own vehicle SV is not moving (is in the stopped state) at the parking movement start position P1, each of the right projector 12R and the left projector 12L is set to the IR ON state.

Thereafter, while the own vehicle SV is moving from the parking movement start position P1 to the parking movement complete position P2, since the shadow of the own vehicle SV generated/formed on the right side of the own vehicle SV continues being present all the time, the final radiation OFF condition is not satisfied. Therefore, while the own vehicle SV is moving, each of the right IR projector 12R and the left IR projector 12L remains in the IR ON state.

(Situation 2-2)

A situation 2-2 shown in FIG. 6 is a situation in which the light HL of the headlight of the other vehicle OV2 which is located on the front right side of the own vehicle SV which has stopped at the parking movement start position P1, and thereafter, that light HL continues being radiated.

In the situation 2-2, when the own vehicle SV is not moving (is in the stopped state) at the parking movement start position P1, the left luminance check area satisfies the provisional radiation ON condition the first threshold count Qth1 times or more. Therefore, since the final radiation ON condition is satisfied when the own vehicle SV is not moving (is in the stopped state) at the parking movement start position P1, each of the right IR projector 12R and the left IR projector 12L is set to the IR ON state.

Thereafter, while the own vehicle SV is moving from the parking movement start position P1 to the parking movement complete position P2, since at least the left luminance check area does not satisfy the provisional radiation OFF condition, the final radiation OFF condition is not satisfied. Therefore, while the own vehicle SV is moving, each of the right IR projector 12R and the left IR projector 12L remains in the IR ON state.

(Situation 2-3)

A situation 2-3 shown in FIG. 6 is a situation in which the light HL of the headlight of the other vehicle OV2 located behind and far from the own vehicle SV is radiated when the own vehicle SV is not moving (is in the stopped state) at the parking movement start position P1, and thereafter, that light HL continues being radiated.

In the situation 2-3, when the own vehicle SV is not moving (is in the stopped state) at the parking movement start position P1, since the light HL does not reach the left luminance check area and the right luminance check area, each of the left luminance check area and the right luminance check area satisfies the provisional radiation ON condition the first threshold count Qth1 times or more. Therefore, since the final radiation ON condition is satisfied when the own vehicle SV is not moving (is in the stopped state) at the parking movement start position P1, each of the right IR projector 12R and the left IR projector 12L is set to the IR ON state.

While the own vehicle SV is moving from the parking movement start position P1 to the parking movement complete position P2, a direction of the own vehicle SV continues changing. For this reason, since the shadow of the own vehicle SV is generated/formed on the left side of the own vehicle SV, at least the left luminance check area does not satisfy the provisional radiation OFF condition due to that shadow. Furthermore, when the own vehicle SV arrives in the vicinity of the parking movement complete position P2, neither the right luminance check area nor the left luminance check area satisfies the provisional radiation OFF condition. Therefore, while the own vehicle SV is moving from the parking movement start position P1 to the parking movement complete position P2, the final radiation OFF condition is not satisfied. Therefore, while the own vehicle SV is moving, each of the right IR projector 12R and the left IR projector 12L remains in the IR ON state.

(Situation 3-1)

Figure 7:
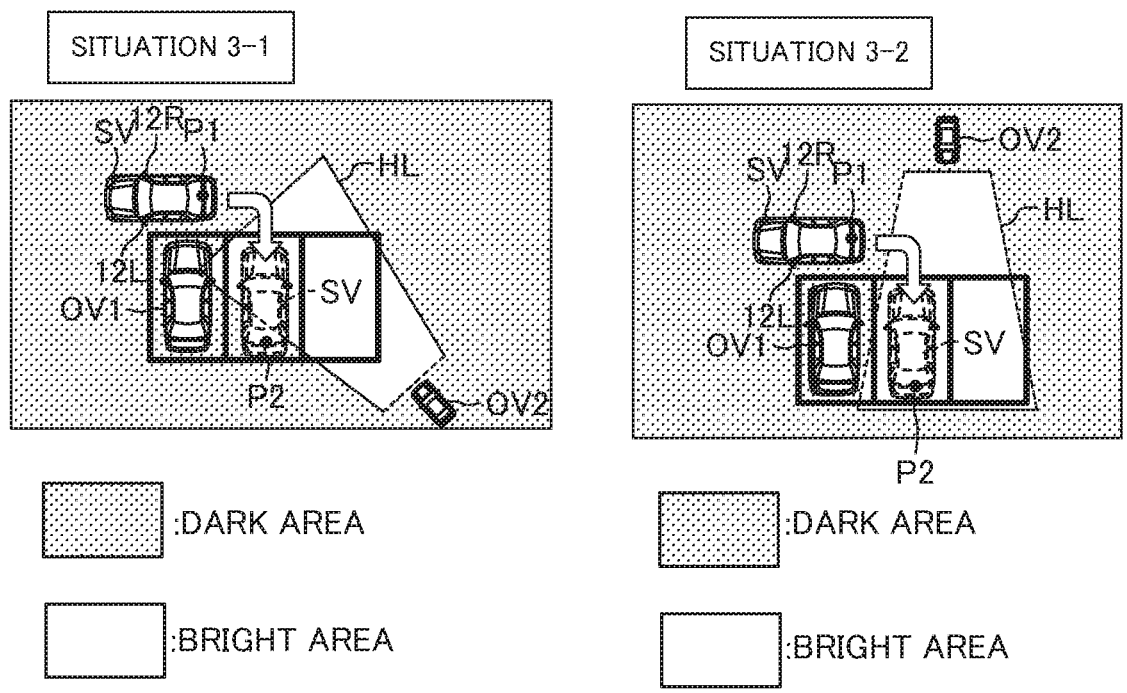
FIG. 7 is a plan view illustrating control of the invisible light projector which is performed in situations 3-1 and 3-2.

A situation 3-1 shown in FIG. 7 is a situation in which the light HL of the headlight of the other vehicle OV2 located on a left backward side of the own vehicle SV is radiated when the own vehicle SV is not moving (is in the stopped state) at the parking movement start position P1, and thereafter, that light HL continues being radiated.

In the situation 3-1, since the light HL does not reach the own vehicle SV when the own vehicle SV is not moving (is in the stopped state) at the parking movement start position P1, each of the left luminance check area and the right luminance check area satisfies the provisional radiation ON condition the first threshold count Qth1 times or more. Accordingly, since the final radiation ON condition is satisfied when the own vehicle SV is not moving (is in the stopped state) at the parking movement start position P1, each of the right IR projector 12R and the left IR projector 12L is set to the IR ON state.

In a period after the own vehicle SV starts to move from the parking movement start position P1 and before it reaches the parking movement complete position P2, the own vehicle SV enters the radiation range of the light HL of the headlight. Thus, the shadow of the own vehicle SV starts to be generated/formed on the left side of the own vehicle SV so that the left luminance check area does not satisfy the provisional radiation OFF condition. Therefore, while the own vehicle SV is moving from the parking movement start position P1 to the parking movement complete position P2, the final radiation OFF condition is not satisfied. Accordingly, while the own vehicle SV is moving, each of the right IR projector 12R and the left IR projector 12L remains in the IR ON state.

(Situation 3-2)

A situation 3-2 shown in FIG. 7 is a situation in which the light HL of the headlight of the other vehicle OV2 located on a right backward side of the own vehicle SV is radiated when the own vehicle SV is not moving (is in the stopped state) at the parking movement start position P1, and thereafter, that light HL continues being radiated. The light HL of the headlight is being radiated to the whole parking space including the parking movement complete position P2 of the own vehicle SV.

In the situation 3-2, when the own vehicle SV is not moving (is in the stopped state) at the parking movement start position P1, each of the left luminance check area and the right luminance check area satisfies the provisional ON condition the first threshold count Qth1 times or more. Therefore, since the final radiation ON condition is satisfied when the own vehicle SV is not moving (is in the stopped state) at the parking movement start position P1, each of the right IR projector 12R and the left IR projector 12L is set to the IR ON state.

Thereafter, the left luminance check area does not satisfy the provisional radiation OFF condition until a time point at which the shadow of the own vehicle SV generated/formed on the left side of the own vehicle SV becomes sufficiently small after the own vehicle SV enters the radiation range of the light HL of the headlight. Therefore, since the final radiation OFF condition is not satisfied until that time point, each of the right IR projector 12R and the left IR projector 12L remains in the IR ON state.

Furthermore, after that, when the own vehicle SV approaches the parking movement complete position P2, each of the right luminance check area and the left luminance check area continues satisfying the provisional radiation OFF condition, and thus, the final radiation OFF condition is satisfied. In this case, each of the right IR projector 12R and the left IR projector 12L is set/changed to the IR OFF state.

Thereafter, until the own vehicle SV arrives at the parking movement complete position P2, since at least any one of the right luminance check area and the left luminance check area (in this case, both of the right luminance check area and the left luminance check area) does not satisfy the provisional radiation ON condition, the final radiation ON condition is not satisfied. Therefore, each of the right IR projector 12R and the left IR projector 12L remains in the IR OFF state.

(Situation 4)

Figure 8:
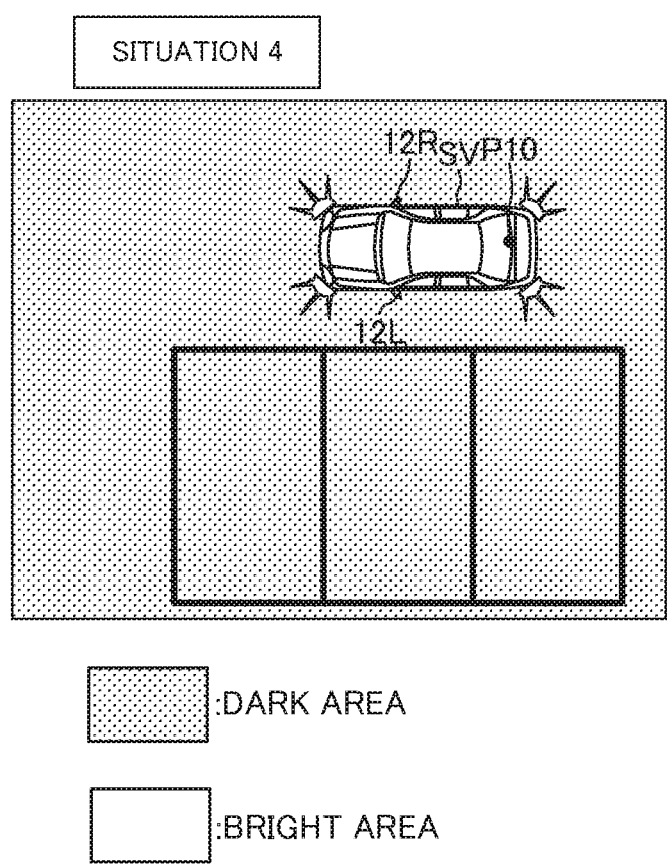
FIG. 8 is a plan view illustrating control of the invisible light projector which is performed in situation 4.

A situation 4 shown in FIG. 8 is a situation in which the own vehicle SV has stopped at a stop position P10, the entire surroundings of the own vehicle SV at the stop position P10 are dark, and the hazard lamp of the own vehicle SV starts to blink.

In the situation 4, since the final radiation ON condition is satisfied at a time point before the hazard lamp starts to blink, each of the right IR projector 12R and the left IR projector 12L is set to the IR ON state. After the time point at which the hazard lamp starts to blink, a case may occur where each of the right luminance check area and the left luminance check area satisfies the provisional radiation OFF condition in a period in which the hazard lamp is turned up/on. However, since the hazard lamp is turned off after the time Th elapses, the determination that each of the right luminance check area and the left luminance check area satisfies the provisional radiation OFF condition is not made consecutively the second threshold count Qth2 times. Therefore, since the final radiation OFF condition is not satisfied, while the hazard lamp of the own vehicle SV is continuously blinking, each of the right IR projector 12R and the left IR projector 12L remains in the IR ON state (that is, each of their states does not switch from the IR ON state to the IR OFF state).

It should be noted that, while each of the right IR projector 12R and the left IR projector 12L is in the IR OFF state, if the hazard lamp of the own vehicle SV starts to blink, and thereafter, the own vehicle SV moves to "the place where the entire surroundings of the own vehicle SV are dark", each of the states of the right IR projector 12R and the left IR projector 12L is as follows. If the brightness is insufficient even when the hazard lamp is turned up, and thus, the provisional radiation ON condition is satisfied, the provisional radiation ON condition is also satisfied when the hazard lamp is turned off. Therefore, the final radiation ON condition is satisfied. For this reason, each of the right IR projector 12R and the left IR projector 12L is set to the IR ON state. In this case, since the provisional radiation OFF condition is naturally not satisfied while the hazard lamp is turned off, the final radiation OFF condition is not satisfied. Therefore, each of the right IR projector 12R and the left IR projector 12L remains in the IR ON state.

In contrast, when each of the right IR projector 12R and the left IR projector 12L has been set to the IR OFF sate, and if the provisional radiation ON condition is not satisfied while the hazard lamp is turned up/om, the final radiation ON condition ends up being not satisfied even if the provisional radiation ON condition is satisfied while the hazard lamp is turned off.

Therefore, in this case, each of the right IR projector 12R and the left IR projector 12L remains in the IR OFF state.

As understood from the above description, it is prevented that the IR projector 12 frequently switches between the IR ON state and the IR OFF state due to the hazard lamp blinking.

(Situation 5-1)

A situation 5-1 is a situation in which the own vehicle SV has stopped (is not moving) at the stop position P10 and the other vehicle OV2 passes on the right side of the own vehicle SV with the light HL of the headlight turned up/on.

In this case, in a period in which the light HL of the headlight of the other vehicle OV2 is radiated to a right surface of the own vehicle SV, the shadow of the own vehicle SV is generated/formed on the left side of the own vehicle SV, and thus, the left luminance check area satisfies the provisional radiation ON condition the first threshold count Qth1 times or more. Therefore, since the final radiation ON condition is satisfied, each of the right IR projector 12R and the left IR projector 12L is set to the IR ON state.

Thereafter, until the other vehicle OV2 passes through the side of the own vehicle SV, the left luminance check area does not satisfy the provisional radiation OFF condition even if the right luminance check area satisfies the provisional radiation OFF condition, and therefore, the final radiation OFF condition is not satisfied. Furthermore, after the other vehicle OV2 passes through the right side of the own vehicle SV, the final radiation OFF condition is not satisfied. Therefore, each of the right IR projector 12R and the left IR projector 12L remains in the IR ON state.

Therefore, in such a situation (i.e., the situation in which there is a moving light source including the headlight of the other vehicle OV2), it is prevented that the IR projector 12 frequently switches between the IR ON state and the IR OFF state.

(Situation 5-2)

Figure 9:
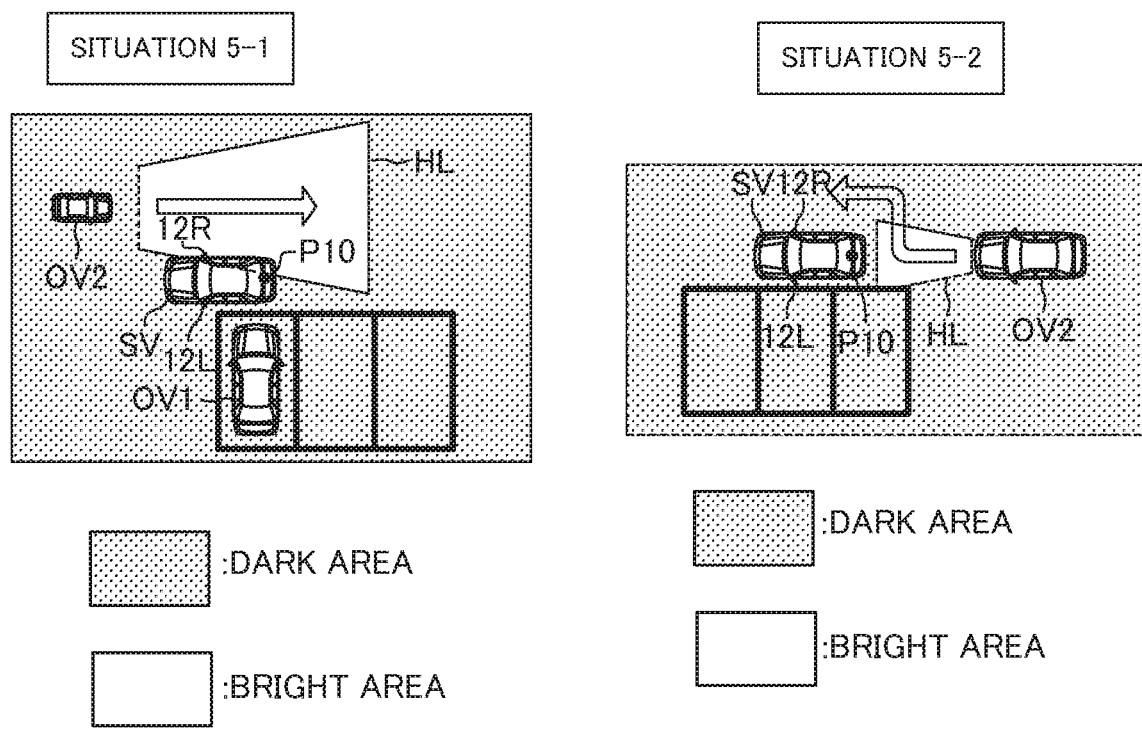
FIG. 9 is a plan view illustrating control of the invisible light projector which is performed in situations 5-1 and 5-2.

A situation 5-2 shown in FIG. 9 is a situation in which the own vehicle SV has stopped at the stop position P10, the other vehicle OV2 approaches the rear portion of the own vehicle SV with the headlight HL turned up/on, and thereafter, the other vehicle OV2 passes on the right side of the own vehicle SV.

In this case, in a period in which the other vehicle OV2 is located far away, and thus, the light HL of the headlight of the other vehicle OV2 does not reach the own vehicle SV, the final radiation ON condition is satisfied. Therefore, each of the right IR projector 12R and the left IR projector 12L is set to the IR ON state.

Thereafter, when the light HL of the headlight of the other vehicle OV2 starts to reach the own vehicle SV, a case may occur where each of the right luminance check area and the left luminance check area satisfies the provisional radiation OFF condition. However, since the other vehicle OV2 changes its course immediately after the light HL has reached the own vehicle SV and passes on the right side of the own vehicle SV, neither the right luminance check area or the left luminance check area satisfies the provisional radiation OFF condition the second threshold count Qth2 times or more. Therefore, the final radiation OFF condition is not satisfied. Furthermore, the final radiation OFF condition is not satisfied after the other vehicle OV2 passes through the own vehicle SV. Therefore, each of the right IR projector 12 and the left IR projector 12L remains in the IR ON state.

Therefore, in such a situation (i.e., the situation in which there is the moving light source including the headlight of the other vehicle OV2), it is prevented that the IR projector 12 frequently switches between the IR ON state and the IR OFF state.

<Specific Operation>

Figure 10:
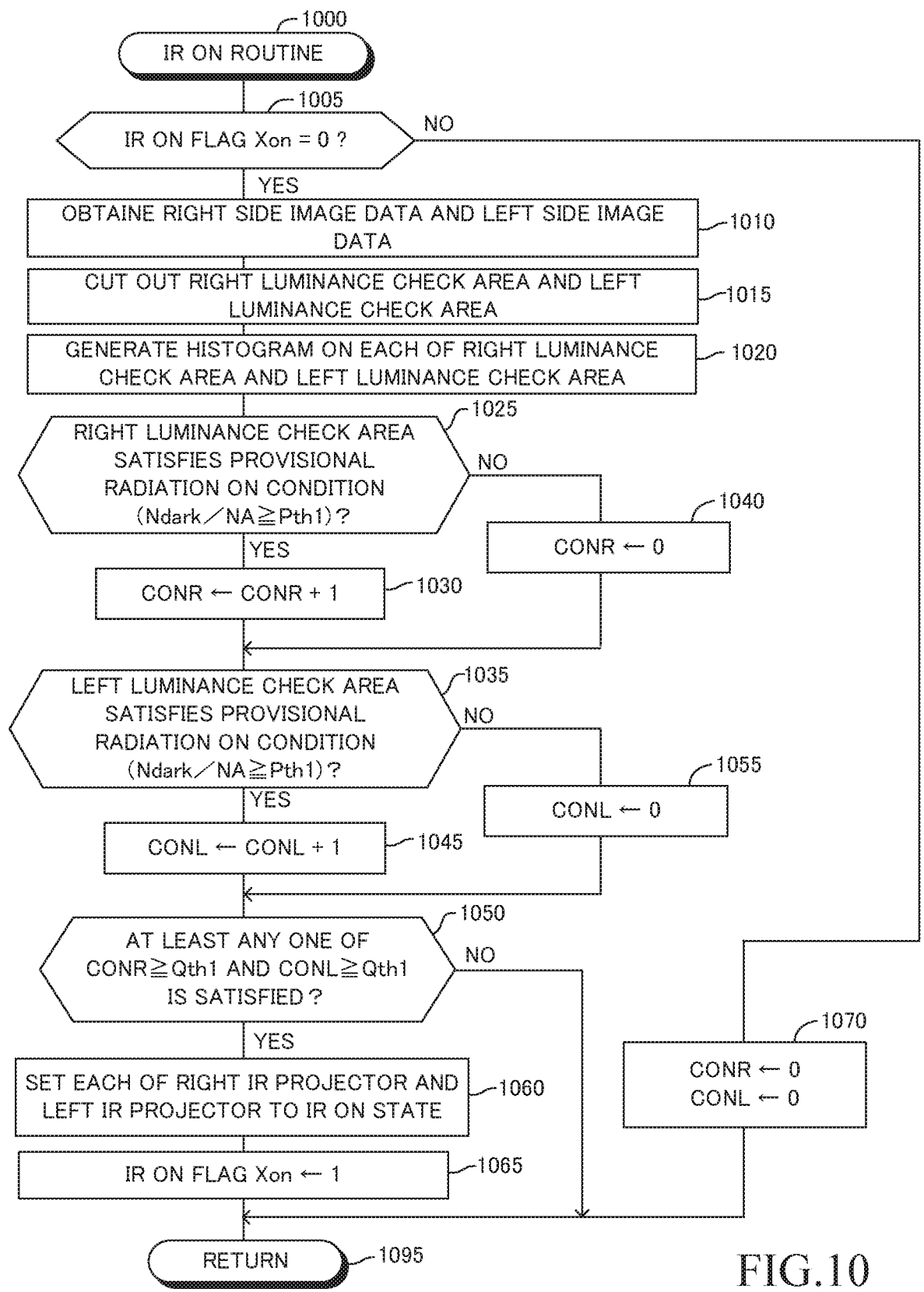
FIG. 10 is a flowchart showing an IR ON routine executed by a CPU of a PVM-ECU shown in FIG. 1.

When an ignition key switch is positioned at an ON position, the CPU executes an IR ON routine represented by a flowchart shown in FIG. 10, every time a first predetermined time $\Delta t1$ (in this embodiment, $\Delta t1 = \Delta t$) elapses. Therefore, at a predetermined timing, the CPU starts processing from step 1000 in FIG. 10 and proceeds to step 1005 to determine whether or not a value of an IR ON flag Xon (hereinafter, simply referred to as a "flag Xon") is "0".

The flag Xon indicates that each of the right projector 12R and the left projector 12L is set to the IR ON state, when its value is "0". The flag Xon indicates that each of the right IR projector 12R and the left IR projector 12L is set to the IR ON state, when its value is "1". It should be noted that the value of the flag Xon is set to "0" through an initialization routine (not shown) executed when the position of the ignition key switch of the own vehicle SV is changed from an OFF position to the ON position. Furthermore, when the initialization routine is executed, each of the right IR projector 12R and the left IR projector 12L is set to the IR OFF state, and values of various counters (CONR, CONL, and COFF) described later are set to "0".

When the value of the flag Xon is "0", the CPU makes a "Yes" determination at step 1005 to sequentially execute the processes of steps from step 1010 to step 1020 described below, and thereafter, proceeds to step 1025.

Step 1010: the CPU obtains the right side image data from the right side camera 11c and the left side image data from the left side camera 11d.

Step 1015: the CPU cuts out (extracts) the right luminance check area from the right side image data and cuts out (extracts) the left luminance check area from the left side image data.

Step 1020: the CPU generates/makes the above-described histogram (hereinafter, referred to as a "right histogram") indicative of luminance distribution in the right luminance check area. Furthermore, the CPU generates/makes the above-described histogram (hereinafter, referred to as a "left histogram") indicative of luminance distribution in the left luminance check area.

At step 1025, the CPU determines whether or not the right luminance check area satisfies the provisional radiation ON condition (Ndark/NA>Pth1) based on the right histogram.

When the right luminance check area satisfies the provisional radiation ON condition, the CPU makes a "Yes" determination at step 1025 and proceeds to step 1030 to increase the value of the right ON counter CONR by "1". Thereafter, the CPU proceeds to step 1035. In contrast, when the right luminance check area does not satisfy the provisional radiation ON condition, the CPU makes a "No" determination at step 1025 and proceeds to step 1040 to set the value of the right ON counter to "0". Thereafter, the CPU proceeds to step 1035.

As understood form the above description, the value of the right ON counter CONR is indicative of the number of consecutive determinations (a consecutive determination number), each determination being made when the right luminance check area satisfies the provisional radiation ON condition.

At step 1035, the CPU determines whether or not the left luminance check area satisfies the provisional radiation ON condition (Ndark/NA≥Pth1) based on the left histogram.

When the left luminance check area satisfies the provisional radiation ON condition, the CPU makes a "Yes"

determination at step 1035 and proceeds to step 1045 to increase the value of the left ON counter CONL by "1". Thereafter, the CPU proceeds to step 1050.

In contrast, the left luminance check area does not satisfy the provisional radiation ON condition, the CPU makes a "No" determination at step 1035 and proceeds to step 1055 to set a value of the left ON counter CONL to "0". Thereafter, the CPU proceeds to step 1050.

As understood from the above description, the value of the left ON counter CONL is indicative of the number of consecutive determination (a consecutive determination number), each determination being made when the left luminance check area satisfies the provisional radiation ON condition.

At step 1050, the CPU determines whether or not at least any one of the following two conditions (a1), (a2) is satisfied. That is, the CPU determines whether or not the final radiation ON condition is satisfied.

(a1) A condition to be satisfied when the value of the right counter CONR is equal to or larger than the first threshold count Qth1.

(a2) A condition to be satisfied when the value of the left ON counter CONL is equal to or larger than the first threshold count Qth1.

When the final radiation ON condition is not satisfied, the CPU makes a "No" determination at step 1050 and directly proceeds to step 1095 to tentatively terminate the present routine. In this case, each of the right IR projector 12R and the left IR projector 12L is kept (remains) in the IR OFF state.

In contrast, when the final radiation ON condition is satisfied, the CPU makes a "Yes" determination at step 1050 to sequentially execute the processes of steps 1060 and 1065 described below. Thereafter, the CPU proceeds to step 1095 to tentatively terminate the present routine.

Step 1060: the CPU sets/switches each of the right IR projector 12R and the left IR projector 12L to the IR ON state.

Step 1065: the CPU sets the value of the flag Xon to "1".

When the CPU proceeds to step 1005 after the value of the flag has been set to "1" in the above manner, the CPU makes a "No" determination at step 1005 and proceeds to step 1070 to set the value of the right ON counter CONR to "0" and sets the value of the left ON counter CONR to "0". Thereafter, the CPU proceeds to step 1095 to tentatively terminate the present routine.

Figure 11:
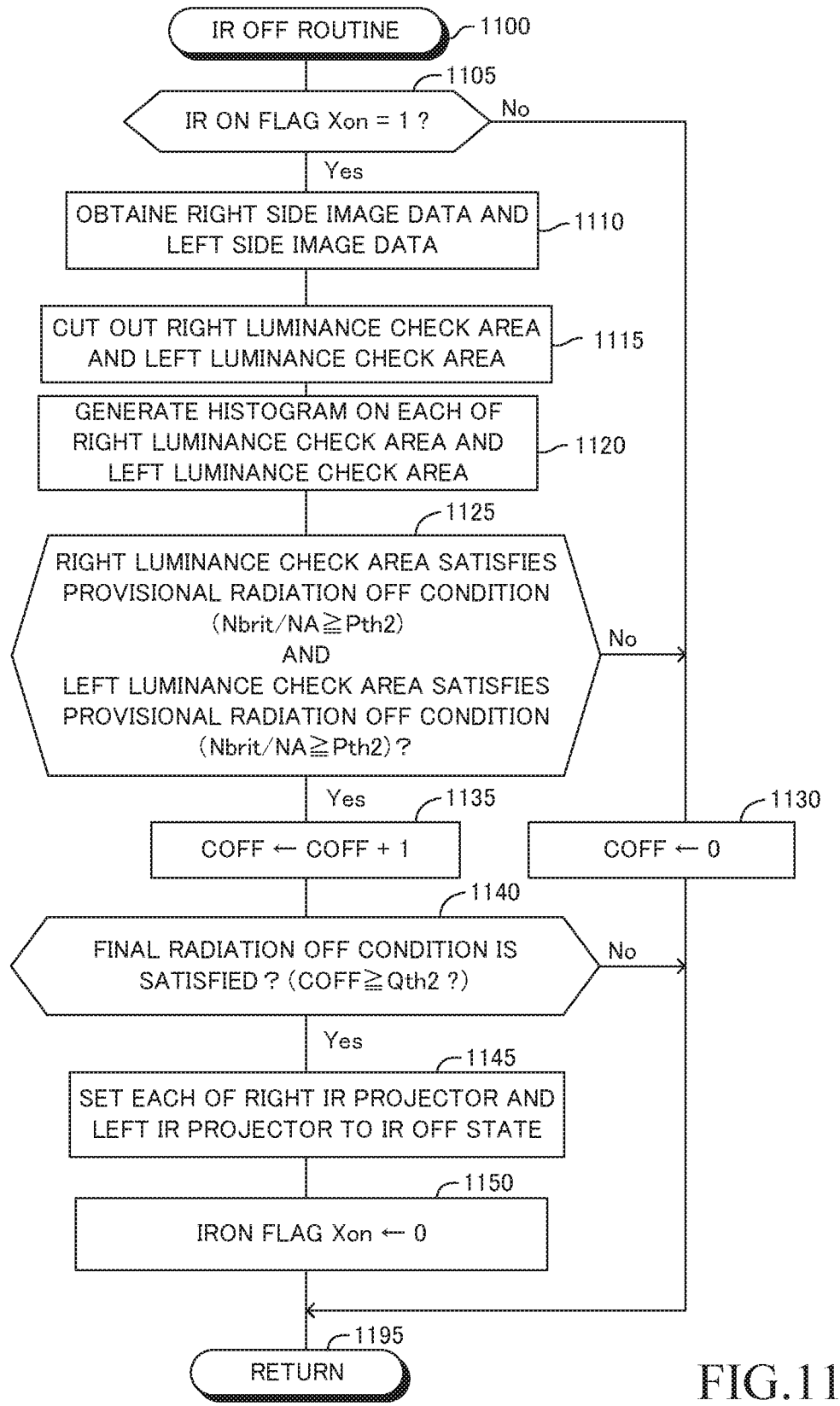
FIG. 11 is a flowchart showing an IR OFF routine executed by the CPU of the PVM-ECU shown in FIG. 1.

Furthermore, the CPU executes an IR OFF routine represented by a flowchart shown in FIG. 11, every time a second predetermined time Δt2 (in this embodiment, Δt2=Δt) elapses. Therefore, at a predetermined timing, the CPU starts processing from step 1100 in FIG. 11 and proceeds to step 1105 to determine whether or not the value of the flag Xon is "1". It should be noted that the second predetermined time Δt2 may be the same as the first predetermined time Δt1 or differ from the first predetermined time Δt1.

When the value of the flag Xon is "1", the CPU executes sequentially the processes of steps from step 1110 to step 1120, and thereafter, proceeds to step 1125. It should be noted that since those steps from step 1110 to step 1120 are the same as the above-described steps from step 1010 to 1020, respectively, the description on them is omitted.

At step 1125, the CPU determines whether or not both of the following two conditions (b1), (b2) are satisfied based on the right histogram and the left histogram.

(b1) A condition to be satisfied when the right luminance check area satisfies the provisional radiation OFF condition (Nbrit/NA≥Pth2).

(b2) A condition to be satisfied when the left luminance check area satisfies the provisional radiation OFF condition (Nbrit/NA≥Pth2).

That is, the CPU determines whether or not each of the right luminance check area and the left luminance check area satisfies the provisional radiation OFF condition.

When at least any one of the right luminance check area and the left luminance check area is not satisfied, the CPU makes a "No" determination at step 1125 and proceeds to step 1130 to set the value of the OFF counter COFF to "0". Thereafter, the CPU proceeds to step 1195 to tentatively terminate the present routine.

In contrast, when each of the right luminance check area and the left luminance check area satisfies the provisional radiation OFF condition, the CPU makes a "Yes" determination at step 1125 and proceeds to step 1135 to increase the value of the OFF counter COFF by "1". As understood from the above description, the value of the OFF counter COFF indicates the number of consecutive determinations, each determination being made when each of the right luminance check area and the left luminance check area satisfies the provisional radiation OFF condition.

Thereafter, the CPU proceeds to step 1140 to determine whether or not the value of the OFF counter COFF is equal to or larger than the second threshold count Qth2. That is, the CPU determines whether or not the final radiation OFF condition is satisfied. When the final radiation OFF condition is not satisfied, the CPU makes a "No" determination at step 1140 and directly proceeds to step 1195 to tentatively terminate the present routine. In this case, each of the right IR projector 12 and the left IR projector 12L is kept (remains) in the IR ON state.

In contrast, when the final radiation OFF condition is satisfied, the CPU makes a "Yes" determination at step 1140 and executes sequentially the processes of steps 1145 and 1150 described below. Thereafter, the CPU proceeds to step 1195 to tentatively terminate the present routine.

Step 1145: the CPU sets/switches each of the right IR projector 12 and the left IR projector 12L to the IR OFF state.

Step 1150: the CPU sets the value of the flag Xon to "0".

When the CPU proceeds to step 1105 after the value of the flag Xon is set to "0" in the above manner, the CPU makes a "No" determination and proceeds to steps 1130 and 1095.

As described above, the present apparatus can increase a possibility that the IR light necessary to assist to photograph with the right side camera 11c and the left side camera 11d is appropriately radiated, even if the illuminance distribution in the surroundings of the own vehicle SV is not uniform. In addition, the present apparatus can decrease a possibility that the IR light is radiated and is not radiated repeatedly (intermittently) at a short interval even if a state in which the brightness (darkness) of the surroundings changes in a short time continues.

The present invention is not limited to the above embodiment and can employ various modified examples within the scope of of the present invention.

The present apparatus may be configured to determine that the final radiation ON condition becomes satisfied when at least any one of the right luminance check area and the left luminance check area satisfies the provisional radiation ON condition. In this case, the first threshold count Qth1 used at step 1050 in the routine of FIG. 10 may be set to one time.

Alternatively, steps 1030, 1040, 1045, 1050, 1055 and step 1070 in FIG. 10 may be omitted.

The present apparatus may be configured to determine that the final radiation OFF condition becomes satisfied when each of the right luminance check area and the left luminance check area satisfies the provisional radiation OFF condition. In this case, the second threshold count Qth2 used at step 1140 in FIG. 11 may be set to one time. Alternatively, steps 1130, 1135, and 1140 in FIG. 11 may be omitted.

If each of the right IR projector 12R and the left IR projector 12L has been set to the IR OFF state, the present apparatus may be configured to set only the right IR projector 12R to the IR ON state when only the right luminance check area satisfies the final radiation ON condition (i.e., CONR≥Qth1 and CONL<Qth1).

Furthermore, if each of the right IR projector 12R and the left IR projector 12L has been set to the IR OFF state, the present apparatus may be configured to set only the left IR projector 12L to the IR ON state when only the left luminance check area satisfies the final radiation ON condition (i.e., CONL≥Qth1 and CONR<Qth1).

Namely, the present apparatus may be configured to set only any one of the right IR projector 12R and the left IR projector 12L corresponding to the luminance check area on the side on which the final radiation ON condition is satisfied, to the IR ON state.

In this case, a case may occur where one of the right IR projector 12R and the left IR projector 12L is set to the IR ON state, and the other is set to the IR OFF state. In this case, when the final radiation OFF condition is satisfied (i.e., when each of the right luminance check area and the left luminance check area satisfies the provisional radiation OFF condition at all determination consecutive opportunities whose number is the second threshold count Qth2), one of the IR projectors 12 which has been set to the IR ON state is set to the IR OFF state and the other one is kept in the IR OFF state. Thereby, the IR light is radiated to only any one of the right radiation range R1 and the left radiation range R2 which needs the radiation of the IR light.

Furthermore, if one of the right IR projector 12R and the left IR projector 12L has been set to the IR ON state and the other has been set to the IR OFF state, the other IR projector 12 which has been set to the IR OFF state is set to the IR ON state when "the luminance check area corresponding to the other IR projector 12 which has been set to the IR OFF state" satisfies the final radiation ON condition. In this case, the IR projector 12 which has been set to the IR ON state is kept in the IR ON state.

Furthermore, although the above-described embodiment is configured to determine whether or not the provisional radiation ON condition is satisfied based on the ratio (=Ndark/NA), it may be configured to determine whether or not the provisional radiation ON condition is satisfied based on a value correlated with the ratio (=Ndark/NA). That is, if the total number NA of pixels in the luminance check area is known, the value Ndark can be used as a value having a correlation with the ratio (=Ndark/NA).

Similarly, although the above-described embodiment is configured to determine whether or not the provisional radiation OFF condition is satisfied based on the ratio (=Nbrit/NA), it may be configured to determine whether or not the provisional radiation ON condition is satisfied based on a value correlated with the ratio (=Nbrit/NA). That is, if the total number NA of pixels in the luminance check area is known, the value Nbrit can be used as a value correlated with the ratio (=Nbrit/NA).

What is claimed is:

1. A vehicle surroundings monitoring apparatus comprising:
    a right side camera to photograph a right side area of a vehicle to obtain right side image data;
    a left side camera to photograph a left side area of said vehicle to obtain left side image data;
    a display device configured to be capable of displaying an image;
    a display control device to cause said display device to display a peripheral image indicative of surroundings of said vehicle based on at least any one of said right side image data and said left side image data;
    a right projector configured to be capable of radiating invisible light to a right radiation range including a part overlapping with said right side area;
    a left projector configured to be capable of radiating invisible light to a left radiation range including a part overlapping with said left side area; and
    a projector control device to set each of said right projector and said left projector to any one of a radiation OFF state so as not to radiate said invisible light and a radiation ON state so as to radiate said invisible light, wherein,
    said projector control device is configured:
    to set at least said right projector to said radiation ON state when a right final radiation ON condition becomes satisfied in a case where said right projector has been set to said radiation OFF state, said right final radiation ON condition requiring that a right luminance check area satisfies a right provisional radiation ON condition in order for said right final radiation ON condition to be satisfied, said right luminance check area corresponding to said right radiation range within a right side image represented by said right side image data, said right provisional radiation ON condition being a condition to be satisfied when a ratio of the number of pixels included in said right luminance check area and having a luminance equal to or smaller than a first threshold luminance to the number of all pixels included in said right luminance check area is equal to or larger than a first threshold value;
    to set at least said left projector to said radiation ON state when a left final radiation ON condition becomes satisfied in a case where said left projector has been set to said radiation OFF state, said left final radiation ON condition requiring that a left luminance check area satisfies a left provisional radiation ON condition in order for said left final radiation ON condition to be satisfied, said left luminance check area corresponding to said left radiation range within a left side image represented by said left side image data, said left provisional radiation ON condition being a condition to be satisfied when a ratio of the number of pixels included in said left luminance check area and having a luminance equal to or smaller than said first threshold luminance to the number of all pixels included in said left luminance check area is equal to or larger than said first threshold value; and
    to set each of said right projector and said left projector to said radiation OFF state, when a final radiation OFF condition becomes satisfied in a case where at least any one of said right projector and said left projector has been set to said radiation ON state, said final radiation OFF condition requiring that said right luminance check area satisfies a right provisional radiation OFF condition and said left luminance check area satisfies a left provisional radiation OFF condition in order for said final radiation OFF condition to be satisfied, said right provisional radiation OFF condition being a condition to be satisfied when a ratio of the number of pixels included in said right luminance check area and having a luminance equal to or larger than a second threshold luminance which is larger than said first threshold luminance to the number of all pixels included in said right luminance check area is equal to or larger than a second threshold value which is larger than said first threshold value, said left provisional radiation OFF condition being a condition to be satisfied when a ratio of the number of pixels included in said left luminance check area and having a luminance equal to or larger than said second threshold luminance to the number of all pixels included in said left luminance check area is equal to or larger than said second threshold value.

2. The vehicle surroundings monitoring apparatus according to claim 1, wherein, said projector control device is configured:

to set each of said right projector and said left projector to said radiation ON state, when said final radiation ON condition becomes satisfied owing to at least one of a satisfaction of said right provisional radiation ON condition by said right luminance check area and a satisfaction of said left provisional radiation ON condition by said left luminance check area, in a case where each of said right projector and said left projector has been set to said radiation OFF state; and to set each of said right projector and said left projector to said radiation OFF state, when said final radiation OFF condition becomes satisfied owing to both of a satisfaction of said right provisional radiation OFF condition by said right luminance check area and a satisfaction of said left provisional radiation OFF condition by said left luminance check area, in a case where each of said right projector and said left projector has been set to said radiation ON state.

3. The vehicle surroundings monitoring apparatus according to claim 1, wherein, said projector control device is configured:

to determine whether or not said right luminance check area satisfies said right provisional radiation ON condition every time a first predetermined time elapses, when said right projector has been set to said radiation OFF state;

to determine that said final radiation ON condition becomes satisfied owing to a satisfaction of said right provisional radiation ON condition by said right luminance check area, when a determination that said right luminance check area satisfies said right provisional radiation ON condition is made consecutively first threshold count times which is equal to or larger than two times, when said right projector has been set to said radiation OFF state;

to determine whether or not said left luminance check area satisfies said left provisional radiation ON condition every time said first predetermined time elapses, when said left projector has been set to said radiation OFF state; and to determine that said final radiation ON condition becomes satisfied owing to a satisfaction of said left provisional radiation ON condition by said left luminance check area, when a determination that said left luminance check area satisfies said left provisional radiation ON condition is made consecutively said first threshold count times, when said left projector has been set to said radiation OFF state.

4. The vehicle surroundings monitoring apparatus according to claim 1, wherein, said projector control device is configured:

to determine whether or not said right luminance check area satisfies said right provisional radiation OFF condition and determine whether or not said left luminance check area satisfies said left provisional radiation OFF condition, every time a second predetermined time elapses, when at least any one of said right projector and said left projector has been set to said radiation ON state; and to determine that said final radiation OFF condition becomes satisfied, when a determination that said right luminance check area satisfies said right provisional radiation OFF condition and said left luminance check area satisfies said left provisional radiation OFF condition is made consecutively second threshold count times which is equal to or larger than two times, when at least any one of said right projector and said left projector has been set to said radiation ON state.

* * * * *